(No Model.)
O. WALDEN.
COFFEE ROASTER.
No. 377,443.  Patented Feb. 7, 1888.
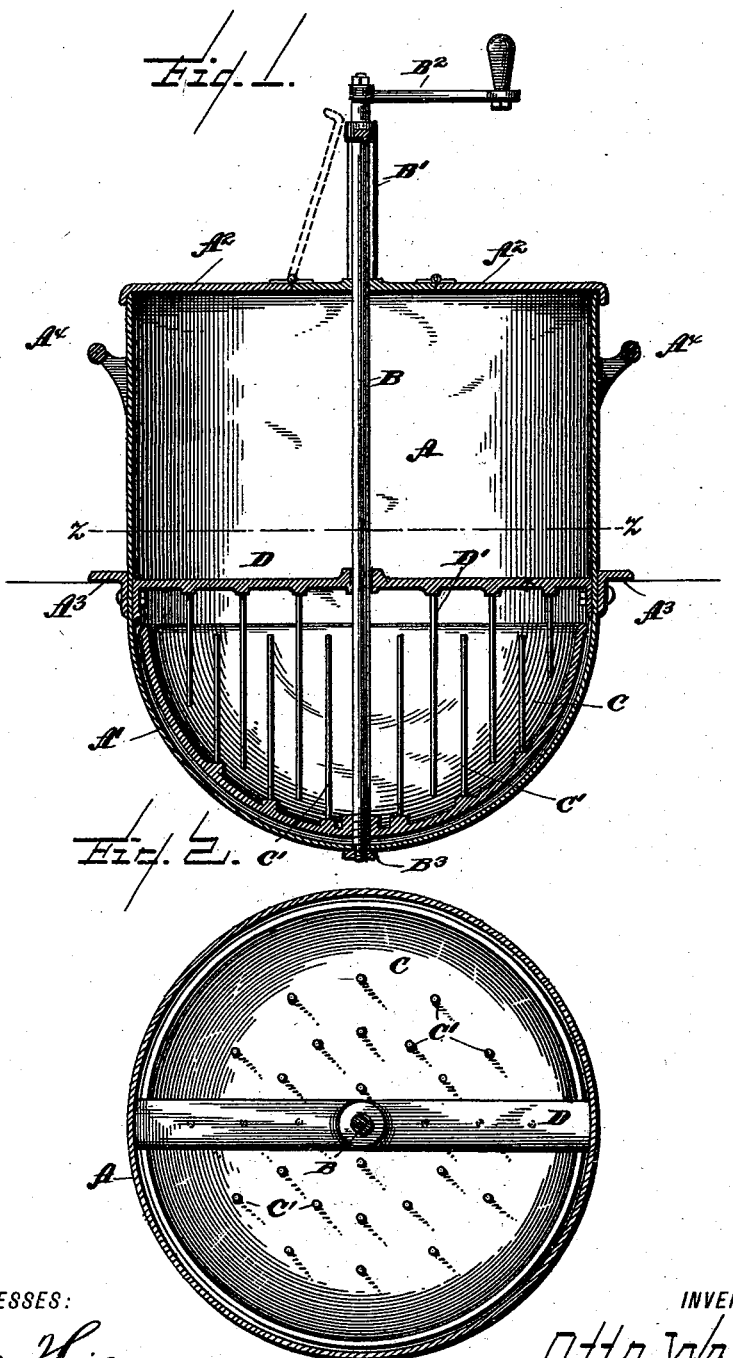
WITNESSES:
INVENTOR
Otto Walden
BY
ATTORNEY

UNITED STATES PATENT OFFICE.

OTTO WALDEN, OF WHEELING, WEST VIRGINIA.

COFFEE-ROASTER.

SPECIFICATION forming part of Letters Patent No. 377,443, dated February 7, 1888.

Application filed June 24, 1887. Serial No. 242,374. (No model.)

*To all whom it may concern:*

Be it known that I, OTTO WALDEN, a citizen of the United States, residing at Wheeling, in the county of Ohio, State of West Virginia, have invented certain new and useful Improvements in Coffee-Roasters, of which the following is a specification, reference being had therein to the accompanying drawings.

This invention has relation to coffee-roasters, and among the objects thereof is to provide a coffee-roaster so arranged and constructed that the grains may be agitated throughout the process of roasting and will always be equally distributed over the bottom of the roaster.

Other objects and advantages of the invention will hereinafter appear, and the novel features thereof will be particularly pointed out in the claims.

Referring to the drawings, Figure 1 is a substantially central vertical section of a coffee-roaster constructed in accordance with my invention; and Fig. 2 is a transverse section of the same, the section being taken on the line z z of Fig. 1.

Like letters of reference indicate like parts in both figures.

A represents the roasting-cylinder, which is preferably formed with the hemispherical bottom A' and provided with the hinged covers A² at its top, whereby coffee may be introduced and removed from the cylinder. Lugs or ears A³ are attached to the sides of the cylinder, by which the same is supported in the hole of the stove. Suitable handles, A⁴, are also provided near the top of the cylinder for convenience of handling. The cylinder A is provided with a central vertical shaft, B, passing through perforations in the top and bottom thereof and supported by standards B', mounted on top of said cylinder and at opposite sides of the shaft. An operating-crank, B², is provided at the top of the shaft and a nut, B³, screw-threaded on the lower end thereof, whereby the same is held in place within the cylinder.

Rigid with the lower end of the shaft B, and in this instance screw-threaded thereon and within the cylinder A, is a hemispherical basin, C, which is adapted to be rotated with and by the shaft B, and is provided throughout its concaved upper surface with agitating-pins C', in this instance secured in sockets with which the basin is provided for this purpose.

Secured at opposite sides of the cylinder above the basin and apertured for the passage of the shaft B is a cross-head, D, which is provided with depending stationary pins or agitators D', which are so arranged with relation to the agitators C' as to alternate with them and permit of their passage therethrough during the operation of revolving the basin when roasting.

By the interposition of this basin in which the coffee is received it is apparent that the grains therein are not exposed to the excessive heat, as would be the case were they directly on the bottom of the cylinder, as is usual, and it is also apparent that by the arrangement of the depending and upwardly-extending agitators or pins the coffee when roasting is continually agitated by revolving the handle which rotates the basin.

Having thus fully described my invention and its operation, what I claim is—

1. In a coffee-roaster, the combination, with the cylinder thereof, having a vertical operating-shaft passing therethrough, and formed with a hemispherical bottom, of a basin conforming to the bottom of the cylinder, mounted within the same, and fixed to the shaft and provided with upwardly-projecting pins, and of a cross-piece mounted in the cylinder above the basin and provided with depending pins alternating with those of the basin, substantially as specified.

2. The combination, with the cylinder A, having the lids A², lugs A³, handle B², and hemispherical bottom A', of the operating-shaft B, mounted in said cylinder and in standards B' upon the same, the basin C, secured to the shaft and having the upwardly-projecting pins C', and the cross-piece D, mounted above the basin and perforated for the reception of the shaft, and provided with depending pins D', alternating with those of the basin, substantially as specified.

In testimony whereof I affix my signature in presence of two witnesses.

OTTO WALDEN.

Witnesses:
JOHN BIEDENBACH,
JOHN WELTY.